United States Patent [19]
Talge, III et al.

[11] Patent Number: 5,716,537
[45] Date of Patent: Feb. 10, 1998

[54] COOKER AND ASSEMBLY METHOD

[75] Inventors: Foster L. Talge, III, Kansas City, Mo.; Jay L. Howard, Vassar, Kans.; David E. Keepper, Lake Winnebago, Mo.; Timothy L. Sparks, Gardner, Kans.

[73] Assignee: The Rival Company, Kansas City, Mo.

[21] Appl. No.: 531,235

[22] Filed: Sep. 19, 1995

[51] Int. Cl.$^6$ .................................................. F27D 11/00
[52] U.S. Cl. ........................ 219/432; 219/436; 219/442
[58] Field of Search ................................. 219/429, 432, 219/436–438, 441–442; 99/331

[56] References Cited

U.S. PATENT DOCUMENTS

| | | | |
|---|---|---|---|
| 1,227,721 | 5/1917 | Wilkinson et al. | 219/436 |
| 2,826,670 | 3/1958 | Keefe, Jr. | 219/438 |
| 3,508,485 | 4/1970 | Munsey | 99/331 |
| 3,681,568 | 8/1972 | Schaefer | 219/432 |
| 3,778,594 | 12/1973 | Wightman | 219/432 |
| 3,831,002 | 8/1974 | Mysicka et al. | 219/432 |
| 3,881,090 | 4/1975 | Scott | 219/436 |
| 3,956,613 | 5/1976 | Dobson et al. | 219/436 |
| 4,270,067 | 5/1981 | Thomas et al. | 219/438 |
| 4,555,616 | 11/1985 | O'Brien | 219/432 |
| 5,243,684 | 9/1993 | Edwards | 219/436 |

OTHER PUBLICATIONS

Four photographs, A, B, C and D (each marked below picture), of prior art base assembly of Betty Crocker fryer: undated.
A. Base assembly on fryer. (One attachment bolt missing; attachment nut removed.) Bale-type handle around back side of fryer.
B. Same as A, closer view.
C. Bottom removed, base ring in place. Insulated electrical connections visible.
D. Bottom and base ring removed. One attachment bolt welded or brazed to stamping; other attachment bolt missing. Insulated electrical connections visible.

Three photographs, E,F, and G (marked on back side), of prior art base assembly of Dazey fryer: undated.

E. Buse removed from casting. Spacer removed from two attachment posts; spacer in place on third attachment post.

F. Base in place on casting; the heads of three attachment screws visible.

G. Side view showing handle mount.

*Primary Examiner*—Teresa J. Walberg
*Assistant Examiner*—Raphael Valencia
*Attorney, Agent, or Firm*—Litman, McMahon and Brown, L.L.C.

[57] ABSTRACT

An electric cooker includes a unitary cast metal cooking vessel and a generally cylindrical base ring sized to mate with a perimeter flange of the cooking vessel. The base ring includes a number of support legs integrally molded therein for support of the cooker as well as a receptacle opening into a first side opening in the base ring for accommodating a pair of power terminal pins via a removable pin attachment block. A base plate, preferably made of metal, includes a center hole positioned to mate with a center boss formed in the cooking vessel bottom and a number of slots are formed in the periphery of the plate to accommodate the molded legs of the base ring.

14 Claims, 4 Drawing Sheets

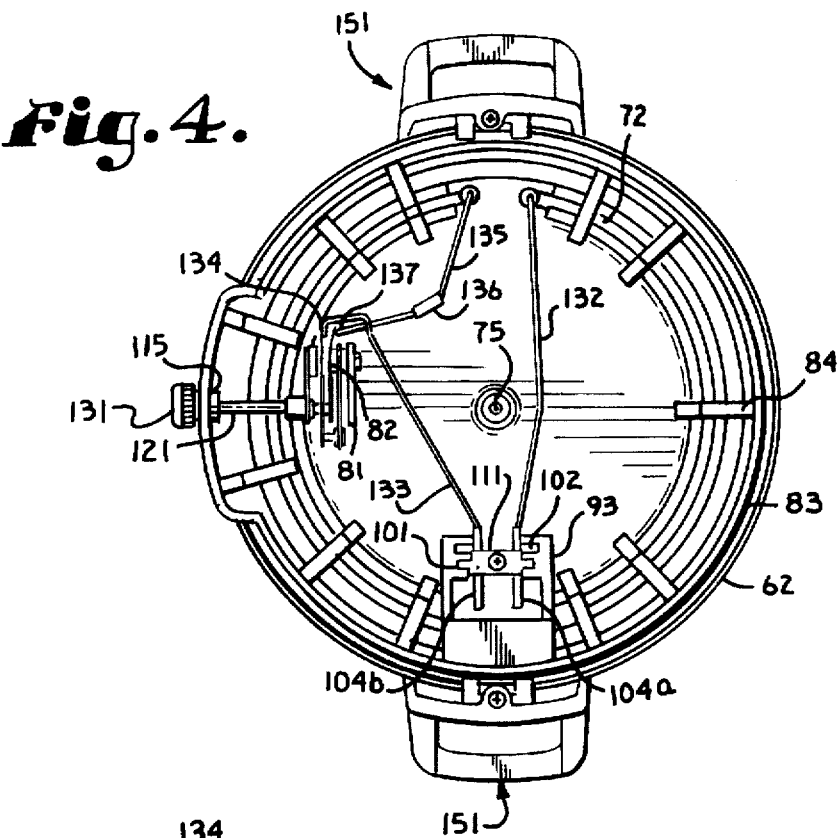
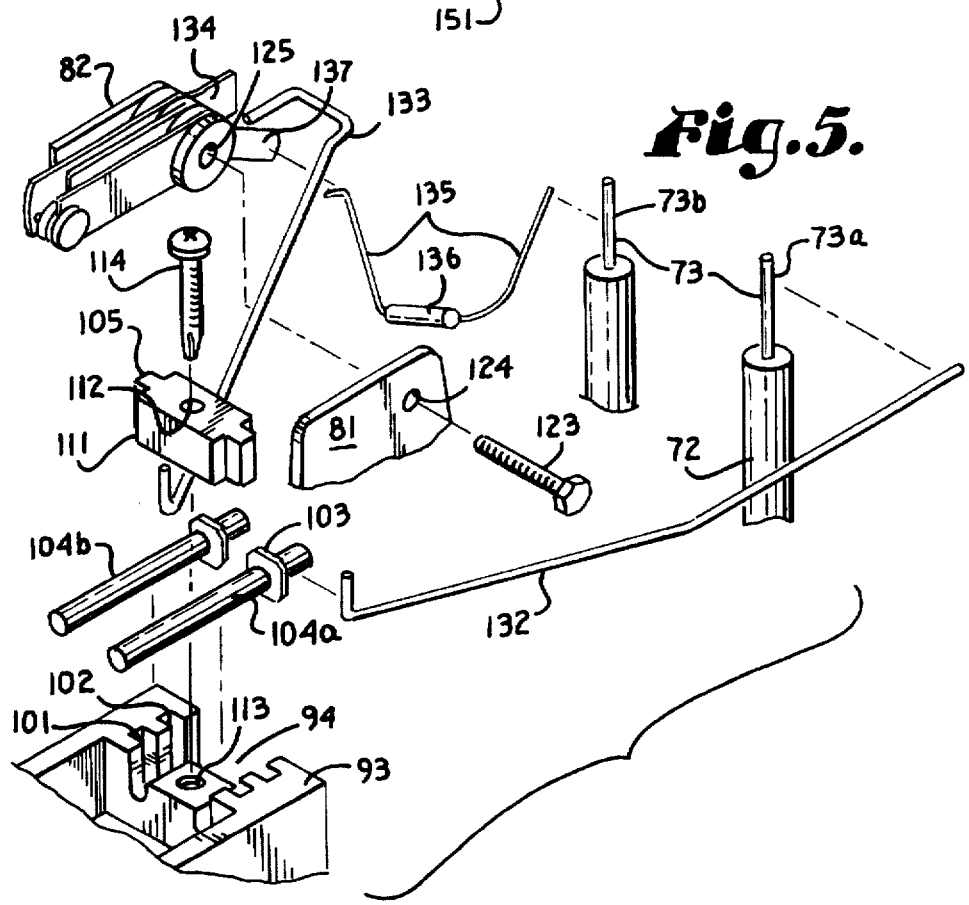

COOKER AND ASSEMBLY METHOD

BACKGROUND OF THE INVENTION

I. Field of the Invention

The present invention relates to a cooker and a method of assembling a cooker. More specifically, the inventive cooker includes a cast metallic cooking vessel and a molded plastic or phenolic base ring with integral legs extending downward through a removable bottom cover plate. Other components, including power terminal pins and bus wires and a bi-metal thermostat, are all designed for greater ease of assembly and increased reliability.

II. Description of The Related Art

Electric, self-contained cookers and fryers have become a standard fixture in many kitchens. In recent years, the small appliance industry has become much more competitive. Manufacturers are constantly striving to decrease assembly costs for electric cookers, and, simultaneously, to increase the reliability of these cookers.

Traditionally, most prior art electric cookers have been constructed with a unitary cooking vessel or pot. Some cookers have cooking vessels which are cast while others use stamped vessels. Cast cooking vessels have advantages over stamped vessels. Cast vessels generally have thicker, stronger bottoms and sidewall, retain heat better, and permit incorporation of stronger, cast mounts for electrical devices and the base itself. On the other hand, it is more difficult, and sometimes impossible, to integrally attach components, such as bosses and mounting plates, to the casting during the assembly process. As a result, certain wired devices have in the past been done after the base is in place on the bottom of the vessel. In addition, the prior art bases generally require at least two points of attachment to the vessel so that the base does not rotate or move in relation to the cast vessel.

Attached to the bottom of a typical unitary cooking vessel is a metallic and ceramic resistive heating element, generally of circular configuration, extending around the bottom periphery of the vessel. A pair of weld cold pins are attached, one to either end of the heating element. A pair of terminal pins are welded to respective ones of the weld cold pins. The terminal pins, which typically include a threaded shaft, then extend through a side opening in a solid base member and are secured there by nuts which are threaded onto each terminal pin shaft. The base side opening and terminal pins thus serve as a receptacle for a female connector of a removable AC power cord. If a thermostatic control is needed, a bi-metal thermostat can be attached to the vessel base and bus wires can be welded to the thermostat and to the resistive heating element weld cold pins and terminal pins such that the thermostat is placed in series with the heating element. A pair of handles or a bale-type handle are usually provided for attachment to respective sides of the cooking vessel near the top thereof, with the handles being attached via screws extending horizontally through the handle, or the end of the bale, and into a projection formed in the cooking vessel.

In typical prior art cookers, assembly involves, for cookers with no thermostat, first welding the terminal pins to the heating element weld cold pins attached to the cooking vessel. Next the solid plastic or phenolic base must be placed over the vessel bottom as the terminal pins are simultaneously "fished" and forced through the side opening of the solid base. Next, the two nuts must be placed over the terminal pin shafts and tightened down to hold the terminal pins in place. If a thermostatic control is added, additional steps of connecting the thermostat to the vessel base and welding additional bus wires to the thermostat and the terminal pins are required prior to installation of the base. Attachment of the solid base to the cooking vessel requires the installation of at least two, and usually three, insulating spacers to two or three threaded bosses, respectively, on the cooking vessel. On stamped vessels, the base can be attached to the vessel via bolts brazed or welded to the underside of the vessel; however, the welding or brazing requires additional assembly operations and can, through the welding or brazing process, result in less secure attachments or weaknesses in the thinner stamped vessel. Moreover, the use of two or three attachment points for bases on cast or stamped vessels places the bolts or bosses, respectively, in relatively close proximity to the heating element, which increases the amount of heat both in the attachment points and to the outside of the base via the bolts or screws used for the attachment. Then, after the base is placed in position and the terminal pins fished through, three screws are threaded through the base bottom and into the bosses in the base of the cooker vessel. Attachment of the individual handles, or ends of the bale-type handle, then requires the cooker to be turned on one side as a first handle is attached and screwed in and then turned on the opposite side for attachment of the second handle.

One principal drawback of prior art cooker assembly methods involving castings is that, in essentially blindly fishing and forcing the terminal pins through the base, the welds are often damaged or even severed, without the knowledge of the assembler. The result is often immediate failure or, at best, a shortened life for the assembled cooker. Another drawback is the sheer number of assembly steps required for assembly of prior art cookers. Finally, prior art handles which are attached by screws extending horizontally often expose the user to screw heads which have been conductively heated by the vessel.

It is clear that a need exists for an improved electric cooker and a simplified method of assembling the electric cooker. Such a cooker assembly method should preferably require fewer and simpler assembly steps, and yet the resulting cooker should be more rugged and reliable than prior art cookers. The completed cooker itself should preferably be designed to provide ready access to the base area for ease of repair and should have an improved handle design which does not expose the user to heated screw heads. Other disadvantages of the prior art, as enumerated above, should also preferably be alleviated as well.

SUMMARY OF THE INVENTION

The present invention is directed to an improved electric cooker and to a method of assembling the cooker. The inventive cooker includes a unitary cast metal cooking receptacle which has an open top and a closed bottom. The vessel bottom has cast integrally therein a generally circular retention channel sized to accommodate a ceramic and metallic resistive heating element, a threaded center boss, and a plate for securing an optional thermostat. The cylindrical side of the vessel extends downward past the closed bottom to form a continuous perimeter flange. A generally cylindrical base ring, which is preferably formed of molded plastic or phenolic material, is sized to mate with the perimeter flange of the cooking vessel. The base ring includes a number of support legs integrally molded therein for support of the cooker as well as a receptacle opening into a first side opening in the ring for accommodating a pair of power terminal pins. The base ring also, optionally, includes a second side opening for accommodating a control shaft of a thermostatic control. A base plate, preferably made of metal, includes a center hole positioned to mate with the center boss of the cooking vessel and a number of slots formed in the periphery of the plate to accommodate the molded legs of the base ring. The cooking vessel includes a pair of handle mounting projections integrally cast therein for accommodating a pair of handles. The projections each have a threaded bore extending substantially vertically which mates with a through bore in the respective handle. Attachment screws then are installed vertically through the handle and into the projection with the screws recessed such that a user is not exposed to heated screw heads.

Assembly of the cooker involves simply placing the base ring on the cooking vessel perimeter flange, registering its correct position by placing projections formed in the base ring into slots formed in the flange, inserting a pair of terminal pins into receiving slots formed in the base ring receptacle and welding the pins to respective weld cold pins on the resistive heating element. An optional retaining block is then screwed into the base ring receptacle to hold the terminal pins in place, and the bottom cover plate is then aligned correctly with the base ring such that the legs protrude through respective slots in the cover plate. The cover plate is then attached to the cooker via a single screw extending through the center hole in the plate and thence into the center post of the cooker vessel. In the event that thermostatic control is required, a thermostat is screwed into the thermostat support plate with the thermostat control shaft extending out the respective side opening in the base ring. Additional bus wires are then welded in place to put the thermostat in series between the terminal pins and the heating element. The handles can be attached while the cooker is turned upside down, thus saving additional assembly steps.

OBJECTS AND ADVANTAGES OF THE INVENTION

Some of the principle objects and advantages of the invention are: to provide an improved electric cooker and a method of assembling the cooker; to provide such a cooker and assembly method which requires fewer and simpler assembly steps than prior art cookers; to provide such a cooker which provides enhanced access to the cooker base for repair and inspection purposes; to provide such a cooker with an improved design and assembly method for connecting power terminal pins; to provide such a cooker in which a base ring and base plate are collectively attached to a cooking vessel via a single screw and are not subject to rotation or movement around the single screw; to provide such a cooker with handles which are easier to assemble and which prevent a user's hands from contacting heated screw surfaces; to provide such a cooker and assembly method which is stronger and more reliable and which results in fewer defects than in conventional cookers and assembly methods; and to provide such a cooker and assembly method which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

BRIEF DESCRIPTION OF THE DRAWINGS

FIG. 4 is a bottom plan view of an assembled cooker, again with the bottom cover plate removed.

FIG. 5 is a perspective, fragmentary, exploded view of the electrical components in the base of the inventive cooker to illustrate the inventive assembly method.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

I. Prior Art Cooker

Figure 1:
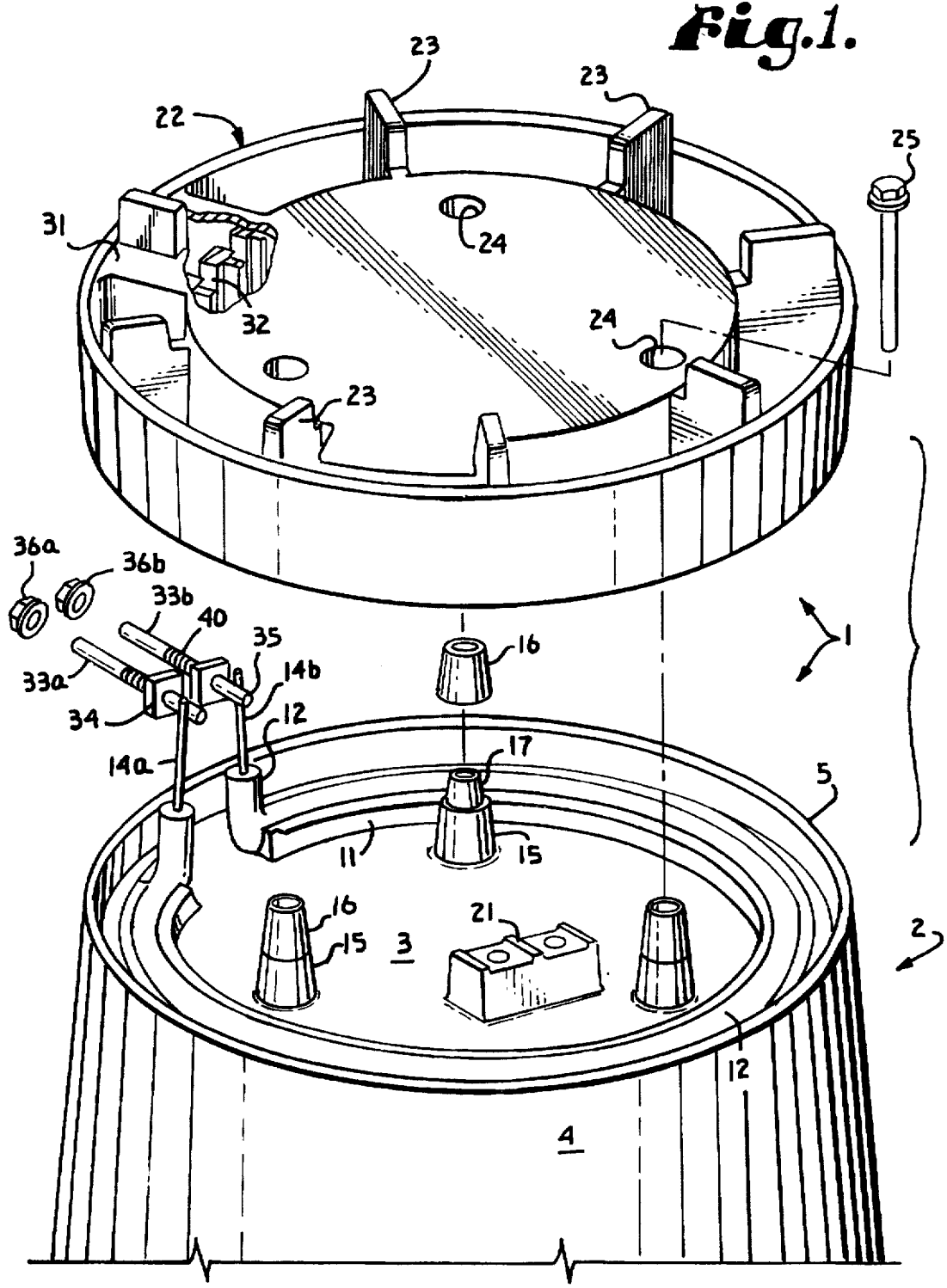
FIG. 1 is a perspective, exploded view of a prior art cooker with no thermostatic control and with portions broken away to illustrate the prior art assembly method.

Referring to FIG. 1, the numeral 1 generally refers to a prior art cooker. The cooker 1 includes a cast metal cooking vessel 2 which is generally cylindrical, but which has a gradually increasing diameter from a closed bottom 3 to an open top (not shown). The vessel 2 includes a continuous outer wall 4 which extends down past the closed bottom 3 to form a bottom perimeter flange 5 of the vessel 2. The vessel 2 includes an integrally cast receptacle 11 for receiving a generally circular resistive heating element 12. The element 12 can be, for example, a metallic and ceramic resistive element with a pair of weld cold pins 14a and 14b extending out from respective ends thereof. Three internally threaded bosses 15 are also integrally cast into and arrayed about the bottom 3 of the vessel 2. Three metal spacers 16 are attachable over the bosses 15, which end in a taper 17 at the top of each to accommodate the spacers 16. A thermostat mounting block 21 for mounting an optional thermostat (not shown) is also integrally cast into the bottom 3 of the vessel 2. A removable, closed base 22, which is preferably made of molded plastic or phenolic material, includes a plurality of leg members 23, here shown as eight, and three bores 24 positioned to mate with respective ones of the bosses 15 and the spacers 16 when the base 22 is correctly positioned over the vessel flange 5. Three screws 25, of which only one is shown, are then inserted into the bores 24 and threaded into the bosses 15 via the spacers 16 to thereby attach the base 22 to the vessel 2. The base 22 also includes a receptacle 31, which is shown partially broken away in FIG. 1, which receptacle 31 includes a pair of channels 32 for receiving a respective pair of terminal pins 33a and 33b and a pair of integral washers 34 for securing the pins 33a and 33b in place. The terminal pins 33a and 33b, in the embodiment shown in FIG. 1, are directly welded to the weld cold pins 14a and 14b, respectively, at weld joints 35 to place them in electrical series with the resistive element 12. A pair of threaded retainer nuts 36a and 36b are tightened over a threaded portion 40 of each respective terminal pin 33a and 33b to thereby hold the pins 33a and 33b in place within the receptacle 31. Should it be desired to add a thermostat (not shown) to the cooker 1, the thermostat would be connected to the block 21 and additional bus wires (also not shown) would be connected to place the thermostat in series with the heating element 12.

Figure 2:
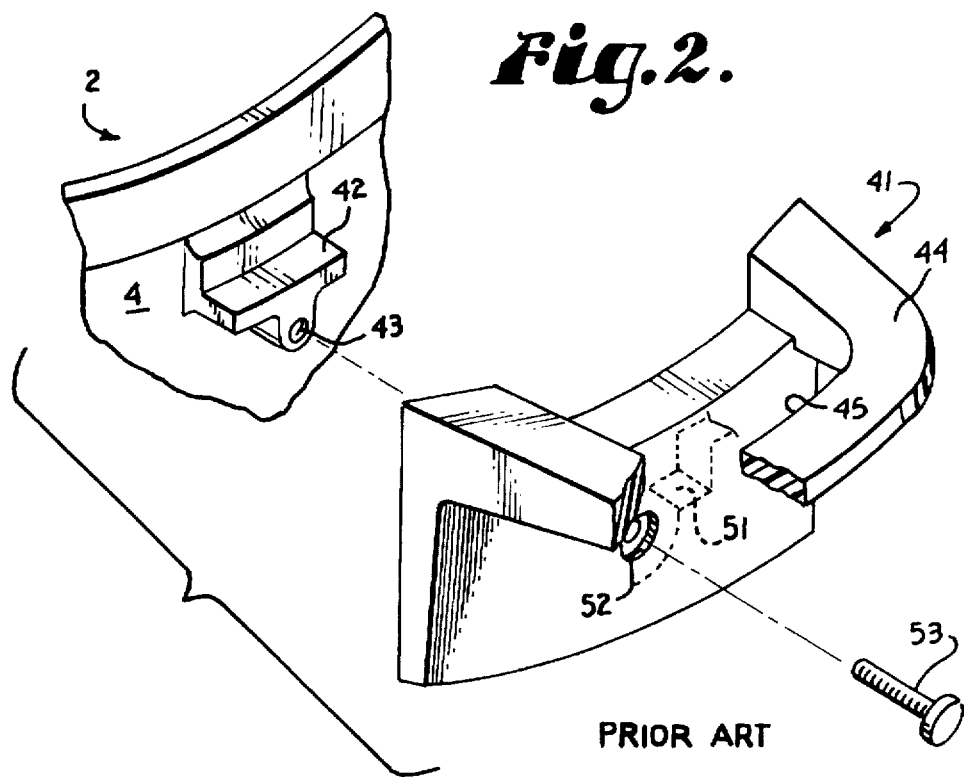
FIG. 2 is a greatly enlarged, fragmentary and exploded view of a handle and handle attachment method for the prior art cooker of FIG. 1, with portions of the handle broken away to better illustrate the construction thereof.

Referring to FIG. 2, a portion of the cooking vessel 2 from the prior art cooker 1 is illustrated along with a handle 41 which is attachable to the cooking vessel 2, or the ends of a bale-type handle would be attached in a similar horizontal manner. Although only one handle 41 is shown, conventionally two of the handles 41 would be attached to the cooker 1, one on either side of the cooking vessel 2. The cooking vessel outer wall 4 has integrally cast therein a pair of projections 42 with corresponding threaded bore 43 formed therein. The handle 41 includes a hand grip portion 44, shown partially broken away, forming an opening 45, and a recess 51, shown in phantom lines, which is sized and positioned to mate with the projection 42 in the vessel 2. The handle 41 also has a counter-sunk through bore 52 which is aligned with the threaded bore 43 in the vessel 2 such that a screw 53 can be inserted therein and tightened into the bore 43 to attach the handle 41 to the cooking vessel 2.

As was stated previously, a major drawback of the prior art cooker 1 shown in FIG. 1 is during assembly, when an assembler must, almost blindly, "fish" and force the two terminal pins 33a and 33b into the channels 32 of the receptacle 31 as the base 22 is simultaneously being placed onto the vessel 2. This places stress on the weld joints 35 which can be damaged or even broken by such actions. In addition, since an assembler is working virtually blindly, he or she would likely never know that the weld joints 35 were broken or damaged, and the assembled cooker 1 would be defective from the time it was assembled. In addition, in order for an assembler to attach the handles 41 via the screws 53, the cooker 1 must first be turned on its side or its bottom since there is inadequate working space to attach the screws 53 when the cooker 1 is upside down. This represents additional assembly steps. Furthermore, the design of the handles 41 presents a problem since the position of the screws 53 on the side of the handles 41 allows a user to inadvertently contact the screws 53 with their hands while lifting the cooker 1. This can result in discomfort or even burns from heat conducted to the user's hand from the vessel wall 4 via the screws 53.

II. Cooker

Figure 3:
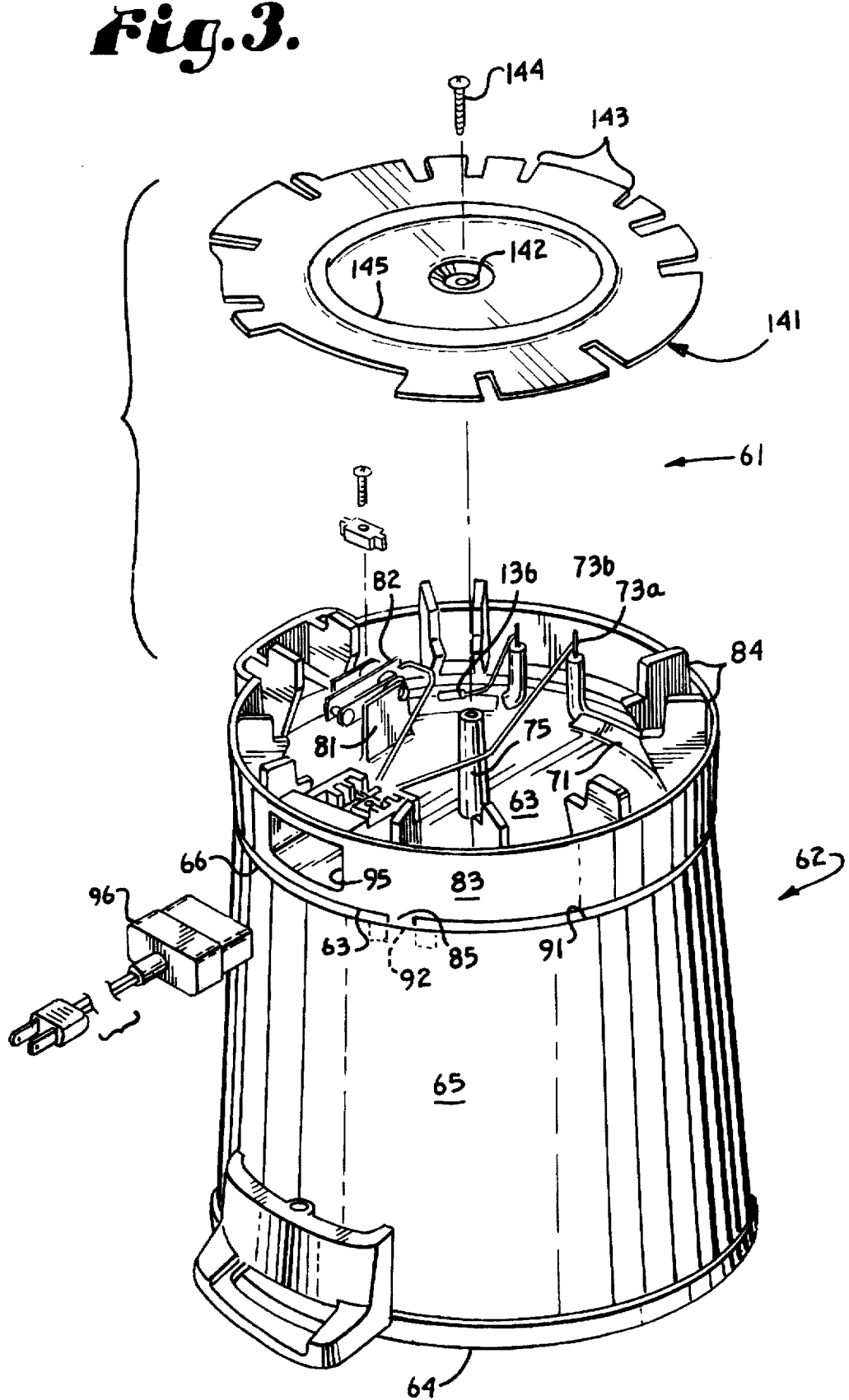
FIG. 3 is a perspective, partially exploded view of the inventive cooker with a thermostatic control, illustrating an assembled cooker vessel with a bottom cover plate and a terminal pin retaining block removed.

Referring to FIGS. 3–6, a cooker 61 in accordance with the present invention is illustrated. Much like the prior art cooker 1 of FIGS. 1 and 2, the cooker 61 as shown in FIG. 3, includes a cast metal cooking vessel 62 which is generally cylindrical, but which has a gradually increasing diameter from a closed bottom 63 to an open top 64. The vessel 62 includes a continuous outer wall 65 which extends down past the closed bottom 63 to form a bottom perimeter flange 66 of the vessel 62. The vessel 62 includes an integrally cast receptacle 71 for receiving a generally circular resistive heating element 72. The element 72, again, can be, for example, a ceramic and metallic resistive element with a pair of weld cold pins 73a and 73b (as shown in FIG. 5) extending out from respective ends thereof. Referring again to FIG. 3, a boss 75 is also integrally cast into and substantially centered in the bottom 63 of the vessel 62, as well as a thermostat mounting plate 81 for mounting a thermostat 82. A removable base ring 83, which is preferably made of heat resistant molded plastic or phenolic material, includes a plurality of leg members 84, here shown as eleven. The base ring 83 includes a plurality of projections 85 which support the ring 83 on the cooking vessel flange 66 while preferably leaving a small gap 91 therebetween. The projections 85 also serve as alignment guides as they mate with respective receiving slots 92 cast into the inside of the cooking vessel flange 66 (FIG. 3). As shown in FIG. 5, the base ring 83 also includes a receptacle 93 integrally molded therein, which receptacle 93 forms a horizontal channel 94 extending to a first side opening 95 (FIG. 3) sized to accommodate a standard female appliance AC power cord 96. As shown in FIG. 5, the receptacle 93 is open and includes a number of vertical slots 101 and 102. The slots 102 are adapted to receive fixed washers 103 on respective terminal pins 104a and 104b while the slots 101 are adapted to receive projections 105 on a pin securing block 111. The block 111 includes a bore 112 which is positioned to mate with a vertically oriented threaded bore 113 in the receptacle 93 such that the block 111 can be secured in place atop the terminal pins 104a and 104b via a screw 114.

Referring to FIG. 4, the base ring 83 includes a second side opening 115 which is positioned and sized to accommodate a control shaft 121 of the conventional bi-metal thermostat 82. As shown in FIG. 5, the thermostat 82 is connected to the cooking vessel 62 via a threaded bolt 123 extending through a bore 124 in the thermostat mounting plate 81, as well as a mating threaded bore 125 in the thermostat 82. As shown in FIGS. 4 and 5, a control knob 131 is removably connected to the control shaft 121 on the outside of the cooker 61. A first bus wire 132 is connectable, preferably by welding, between the terminal pin 104a and a first one of the weld cold pins 73a on the heating element 72. A second bus wire 133 is connectable between the remaining terminal pin 104b and a first weld tab 134 on one side of the thermostat 82. It should be noted that the first bus wire 132 will typically be pre-welded to the terminal pin 104a and the second bus wire 133 will typically be pre-welded to terminal pin 104b to save assembly steps. It is assumed, for purposes of the assembly description below, in both the inventive cooker 61 and the prior art cooker 1, that such pre-welding has been done. A third bus wire 135, which may include a thermally operated fusible safety link 136 therein, is connectable between a second weld tab 137 on the other side of the thermostat 82 and the remaining weld cold pin 73b on the heating element 72.

As shown in FIG. 3, a base plate 141, which is preferably a stamped metal plate, includes a central through bore 142 and a plurality of peripheral slots 143. Although the area immediately surrounding the through bore 142 is shown herein as recessed in the base plate 141, the through bore 142 need not be in a recessed area. The slots 143 are positioned and sized to receive the leg members 84 in a unique arrangement such that the plate 141 is correctly oriented relative to the base ring 83. A single screw 144 is used to attach the base plate 141 to the vessel 62 via the through bore 142, the screw 144 being threaded into the boss 75 in the bottom of the cooking vessel 62. The base ring 83 is thus secured between the base plate 141 and the vessel 62. The base plate 141 also has a second through bore 145 extending therethrough such that the screw 114 (FIG. 5) for the pin retaining block 111 is accessible through the bore 145 without removing the base plate 141. The base plate 141, attached to the vessel 62 via the single, centered threaded boss 75 and the single attachment screw 144, eliminate the need for insulating spacers similar to the spacers 16 of FIG.

1 since heat transfer problems are minimized due to the maximized spacing of the boss 75 from the heating element 72.

Figure 6:
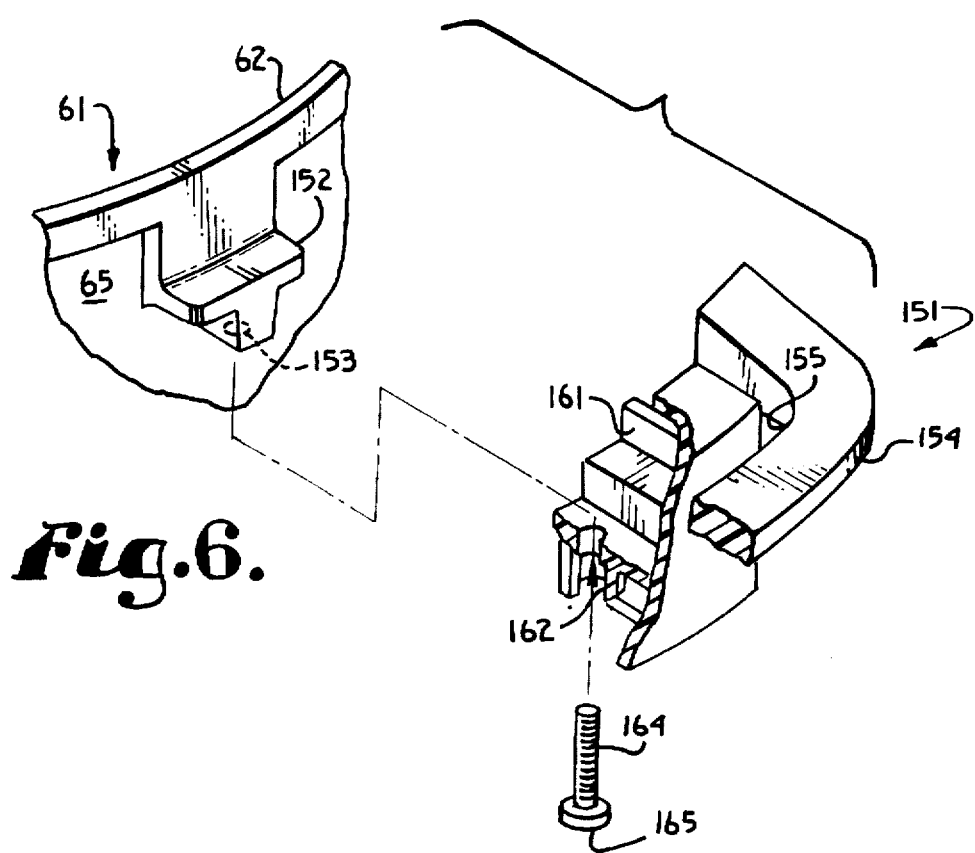
FIG. 6 is a greatly enlarged, fragmentary and exploded view of a handle and handle attachment method for the inventive cooker of FIG. 3, with portions of the handle broken away to illustrate the interior construction thereof.

FIG. 6 illustrates details of one of a pair of handles 151 for attachment to the cooker 61. The handle has been shown broken away to illustrate the interior construction thereof. As in FIG. 2, although only one handle 151 is shown, conventionally two of the handles 151 would be attached to the cooker 61, one on either side of the cooking vessel 62, as shown in FIG. 4. The cooking vessel outer wall 65 has integrally cast therein a projection 152 with a threaded bore 153 formed therein. In contrast to the prior art handle 41, the threaded bore 153 extends vertically upward from the bottom of the projection 152. The handle 151 is similar to the handle 41 in that it includes a hand grip portion 154 forming an opening 155, and a recess 161 which is sized and positioned to mate with the projection 152 of the vessel 62. The handle 151 has a through bore 162 extending upward therethrough, which bore 162 is aligned with the threaded bore 153 in the vessel 62 such that a screw 164 can be inserted therein and tightened into the bore 153 to attach the handle 151 to the cooking vessel 62. The through bore 162 is recessed such that, when the screw 164 is inserted into the bore 162 and tightened into the threaded bore 153, a head 165 of the screw 164 is recessed approximately ¼ inch. This prevents a user of the cooker 61 from inadvertently contacting the heated screw head 165, in contrast to prior art handles, such as the handle 41.

III. Assembly Method

In order to demonstrate the advantages of assembly of the inventive cooker 61, assembly steps for the prior art cooker 1 of FIGS. 1 and 2 will be contrasted side-by-side with the assembly steps for the inventive cooker 61 of FIGS. 3–6. For purposes of the following description, it is assumed that both the prior art cooker 1 and the inventive cooker 61 are equipped with bi-metal thermostats and fusible links similar to the thermostat 82 and the link 135.

| PRIOR ART COOKER ASSEMBLY | INVENTIVE COOKER ASSEMBLY |
|---|---|
| Weld first end of thermal link bus wire to first thermostat weld tab | Weld first lead of third bus wire 135 to second thermostat weld tab 137 |
| Screw thermostat to mounting block 21 on underside of vessel 2 | Screw thermostat 82 to mounting plate 81 on underside of vessel 62 |
| Weld second lead of thermal link bus wire to heating element cold pin 14a | Weld second lead of third bus wire 135 to heating element cold pin 73b |
| Place metal spacer 16 onto first boss 15 on underside of vessel 2 | Slide base ring 83 onto thermostat control shaft 121 |
| Place metal spacer 16 onto second boss 15 on underside of vessel 2 | Place base ring 83 on vessel 62 (align with projections 85/slots 92 in base ring 83/vessel 62, respectively) |
| Place metal spacer 16 onto third boss 15 on underside of vessel 2 | Place terminal pin 104b, (with second bus wire 133 already attached) into slot 102 in receptacle 93 |
| Weld second end of a first bus wire (attached to terminal pin 33a) to thermostat weld tab | Weld second end of second bus wire 133 to first thermostat weld tab 134 |
| Weld second end of a second bus wire (attached to terminal pin 33b) to cold pin 14b of heating element 12 | Place terminal pin 104a (with first bus wire 132 already attached) into second slot 102 in receptacle 93 |
| Slide base 22 onto thermostat control shaft | Weld second end of first bus wire 132 to cold pin 73a of heating element 72 |
| Fish/force terminal pin 33a into first terminal pin slot 32 in the base 22 | Place pin securing block 111 into receptacle 93 (down over terminal pins 104a and 104b) |
| Fish/force terminal pin 33b into second terminal pin slot 32 in the base 22 | Place screw 114 into pin securing block 111 and tighten screw 114 |
| Position base 22 on spacers 16 | Place metal plate 141 on bottom of base ring 83 |
| Insert and tighten first base screw 25 | Insert and tighten base screw 144 into boss 75 through bore 142 in center of metal plate 141 |
| Insert and tighten second base screw 25 | Place first handle 151 over projection 152. |
| Insert and tighten third base screw 25 | Insert screw 164 into first handle 152. |
| Secure terminal pin 33a in the base 22 with nut 36a | Place second handle 151 over projection 152. |
| Secure terminal pin 33b in the base 22 with nut 36b. | Insert screw 164 into second handle 152. |
| Turn cooker 1 on side. | |
| Place first handle 41 over projection 42. | |
| Insert screw 53 into first handle 41 | |
| Turn cooker 1 onto second side. | |
| Place second handle 41 over second projection 42. | |
| Insert screw 53 into second handle 41 | |

Thus it is readily seen that the inventive cooker 61 can be assembled using 6 fewer steps than a similar prior art cooker, such as the cooker 1 when both cookers are similarly equipped. Furthermore, the blind, time consuming and sometimes damaging prior art fishing/forcing steps of inserting the terminal pins are eliminated by the inventive assembly method.

It is to be understood that while certain forms of the preset invention have been illustrated and described herein, it is not to be limited to the specific forms or arrangement of parts described and shown.

What is claimed and desired to be secured by Letters Patent is as follows:

1. A cooker assembly comprising:
    (a) a cooking vessel with an open top and a closed bottom;
    (b) a heating element attached to said closed bottom and having first and second ends;
    (c) a base ring, said base ring having an open top and bottom with the open top being sized to fit about the closed bottom of said vessel, said base ring further including a plurality of legs attached thereto and extending outward past said open bottom of said base ring;
    (d) a bottom plate, said bottom plate including a plurality of slots extending therethrough, said slots being sized and positioned such that each of said plurality of legs extends through a corresponding slot in said bottom plate; and
    (e) attachment means for attaching said bottom plate to said cooking vessel to thereby hold said base ring in place about said cooking vessel closed bottom.

2. A cooker assembly as in claim 1, wherein said base ring further comprises:

(a) a first side opening connecting with a channel, said channel extending from said first side opening inward and being positioned and sized to accommodate a pair of power terminal pins, said pins being connectable at one end to a power cord and, at the other end to respective said first and second ends of said heating element; and (b) a pin holding block attachable within said channel for removably securing said terminal pins within said channel in a selected orientation.

3. A cooker assembly as in claim 1, and further comprising:

(a) a thermostat mounting plate formed in said closed bottom of said vessel;

(b) a thermostat with a control shaft for controlling cooker temperature;

(c) a side opening in said base ring communicating with the interior of the base ring to accommodate said thermostat control shaft.

4. A cooker assembly as in claim 1, said attachment means comprising:

(a) a single mounting boss formed in said closed bottom of said vessel, said boss including a threaded bore extending vertically therein;

(b) a through bore extending through said bottom plate and aligned with said boss when said plate is attached to said cooking vessel; and (c) a threaded screw extending through said through bore in said plate and into said threaded bore in said boss.

5. A cooker assembly as in claim 1, and further comprising:

(a) a flange forming a part of said cooking vessel, said flange at least partially surrounding the closed bottom of said vessel and including at least one guide slot formed on an interior wall of said flange;

(b) said base ring open top being sized to mate with said flange, said base ring further comprising at least one alignment guide positioned to mate with said guide slot in said flange when said base plate is correctly oriented relative to said cooking vessel.

6. A cooker assembly as in claim 1, and further comprising:

(a) at least one handle, said handle having a through bore extending upward from a bottom thereof;

(b) a handle mounting projection extending outward from a side of said cooking vessel proximate the open top thereof, said projection including a substantially vertically oriented threaded bore therein; and (c) a threaded attachment means extending upward through said through bore in said handle and engaging with said threaded bore in said projection for attaching said handle to said cooker vessel.

7. A cooker assembly comprising:

(a) a cooking vessel with an open top and a closed bottom;

(b) a heating element attached to said closed bottom and having first and second ends;

(c) a base ring, said base ring having an open top and bottom with the open top being sized to fit about the closed bottom of said vessel, said base ring further including:

(i) a first side opening connecting with a channel, said channel extending from said first side opening inward and being positioned and sized to accommodate a pair of power terminal pins, said pins being connectable at one end to a power cord and, at the other end to respective said first and second ends of said heating element; and (ii) a pin holding block removably attachable within said channel for removably securing said terminal pins within said channel in a selected orientation.

8. A cooker assembly as in claim 7, and further comprising:

(a) a plurality of legs attached to said base ring and extending outward past said open bottom of said base ring;

(b) a bottom plate, said bottom plate including a plurality of slots extending therethrough, said slots being sized and positioned such that each of said plurality of legs extends through a corresponding slot in said bottom plate; and (c) attachment means for attaching said bottom plate to said cooking vessel to thereby hold said base ring in place about said cooking vessel closed bottom.

9. A cooker assembly as in claim 8, and further comprising:

(a) a thermostat mounting plate formed in said closed bottom of said vessel;

(b) a thermostat with a control shaft for controlling cooker temperature;

(c) a second side opening in said base ring communicating with the interior of the base ring to accommodate said thermostat control shaft.

10. A cooker assembly as in claim 8, said attachment means comprising:

(a) a single mounting boss formed in said closed bottom of said vessel, said boss including a threaded bore extending vertically therein;

(b) a through bore extending through said bottom plate and aligned with said boss when said plate is attached to said cooking vessel; and (c) a threaded screw extending through said through bore in said plate and into said threaded bore in said boss.

11. A cooker assembly as in claim 7, and further comprising:

(a) a flange forming a part of said cooking vessel, said flange at least partially surrounding the closed bottom of said vessel and including at least one guide slot formed on an interior wall of said flange;

(b) said base ring open top being sized to mate with said flange, said base ring further comprising at least one alignment guide positioned to mate with said guide slot in said flange when said base plate is correctly oriented relative to said cooking vessel.

12. A cooker assembly as in claim 7, and further comprising:

(a) at least one handle, said handle having a through bore extending upward from a bottom thereof;

(b) a handle mounting projection extending outward from a side of said cooking vessel proximate the open top thereof, said projection including a substantially vertically oriented threaded bore therein; and (c) a threaded attachment means extending upward through said through bore in said handle and engaging with said threaded bore in said projection for attaching said handle to said cooker vessel.

13. A method of assembling a cooker, said cooker including a cooking vessel with an open top and a closed bottom with a threaded boss attached to said closed bottom; a heating element attached to said closed bottom and having first and second ends; a base ring, said base ring having an open top and bottom with the open top being sized to fit about the closed bottom of said vessel, said base ring further including a plurality of legs attached thereto and extending outward past said open bottom of said base ring; a bottom plate, said bottom plate including a through bore and a plurality of slots extending therethrough, each said slot being sized and positioned to receive a corresponding one of said plurality of legs; and a threaded attachment screw, said method comprising the steps of:

(a) placing said base ring over said closed bottom of said cooking vessel;

(b) inserting said legs through said slots in said plate; and (c) inserting said attachment screw through said through bore in said plate and into said threaded boss attached to said vessel to thereby hold said base ring in place about said cooking vessel closed bottom.

14. A method as in claim 13, wherein said base ring further comprises a first side opening connecting with a channel, said channel extending from said first side opening inward and being positioned and sized to accommodate a pair of power terminal pins, said pins being connectable at one end to a power cord and, at the other end to respective said first and second ends of said heating element; and a pin holding block attachable within said channel for removably securing said terminal pins within said channel in a selected orientation, said method, prior to said leg inserting step, further comprising the steps of:

(a) connecting said terminal pins to respective ones of said first and second heating element ends;

(b) placing said terminal pins within said channel in a position to connect to a removable power cord; and (c) attaching said pin holding block within said channel.

* * * * *